Dec. 6, 1966     G. H. ALLEN     3,289,262
FAIL-SAFE HOOK
Filed Feb. 8, 1965

George H. Allen
INVENTOR.

BY Hayden & Pravel

ATTORNEYS

United States Patent Office 3,289,262
Patented Dec. 6, 1966

3,289,262
FAIL-SAFE HOOK
George H. Allen, P.O. Box 776, La Porte, Tex.
Filed Feb. 8, 1965, Ser. No. 431,098
1 Claim. (Cl. 24—201)

This invention relates to a fail-safe hook provided with means for engaging or disengaging a similar hook arrangement where such engagement or disengagement is achieved only after certain manipulations and where two such hooks, when engaged, cannot be accidentally or unintentionally disengaged by the unintended occurrence of disconnective manipulations.

Hooks for securing lines, sheets, and other maritime apparatus are provided at appropriate terminations, ends, corners, and appropriate points of such maritime apparatus for quickly connecting or disconnecting the apparatus. Similar apparatus is used for aircraft tie downs and for anchoring other devices such as freight carried in freight cars. Bail hooks are commonly intended to be placed under tensile stress and are constructed to transmit the load from the line secured to one such bail hook to the similar hook engaged therewith. In addition to the capability of handling tensile loads, bail hooks should be foolproof and yet, easy to engage and disengage.

Additionally, hooks such as bail hooks are subject to use in all sorts of adverse conditions so that connection of a pair of hooks together is required in all conditions including conditions such as inadequate light and indeed sometimes in total darkness. Devices to which the present invention relate are difficult of manipulation in darkness or aboard boats in heavy seas and require good hand-eye co-ordination to achieve connection. Therefore, the present invention has as its objective the provision of a new and improved hook which guides a similar hook into engagement without visual observation and without the addition of superfluous structure.

A further and important object of this invention is to provide a new and improved fail-safe hook which prevents accidental disengagement which is possible with hooks of the prior art.

An additional object of the present invention is to provide new and improved hooks including a bail hook requiring rotation of each of a pair of engaged bail hooks in different planes through an angular extent making impossible unintended release of the engaged pair.

An important object of this invention is to provide a new and improved hook structure which is tangentially slotted.

One object of the present invention is to provide a new and improved bail hook which requires rotation of about 135° in one plane to align the slot therein with another bail hook which also requires 135° rotation in a perpendicular plane for alignment whereby the bail hooks are positioned for separation.

Yet another object of the present invention is to provide a new and improved hook operable with an identical hook to releasably connect lines, sheets, or other apparatus and having a tangential slot extended to an opening with the encircling structure shaped near the slot to guide the identical hook engaged therewith into the opening.

An additional object of this invention is to provide a new and improved hook having a tangential slot extending through the encircling structure whereby the encircling structure is shaped as a guiding surface for aligning the slot of a similar hook structure.

Another object of the present invention is to provide a slot tangential to an opening of a hook to aid in connection of a pair of hooks together and to aid in keeping them connected.

Another object of this invention is the provision of a fail-safe hook arrangement wherein engagement and disengagement is accomplished only after rotating the encircling portion of the hook towards the line connected thereto in such a manner that the random and occasional movements of the hooks relative to one another resulting from routine usage thereof can never align the slots of the engaged hooks for accidental or unintended disengagement and thereafter cause lateral movement resulting in disconnection.

Other objects and advantages of the present invention will become more readily apparent from the following description and drawings wherein.

Figure 3:
FIG. 3 is a view similar to FIG. 2 with the second of the pair of engaged bail hooks rotated through about 135° to position its slot for disengagement.
Figure 4:
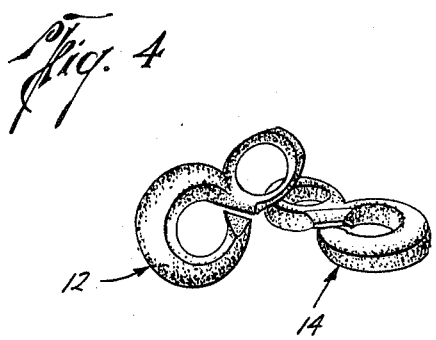
Figure 5:
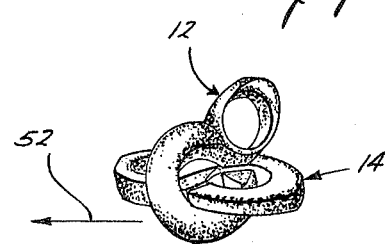

FIG. 4 is a view similar to FIG. 3 in which the two bail hooks have been moved laterally with respect to one another to disengage same, or alternatively, FIG. 4 illustrates the position of the two bail hooks prior to engagement; and FIG. 5 is a partial sectional view taken through a hook incorporating the structure of this invention perpendicularly to the slot therein for illustrating the structure defining the slot.

Figure 1:
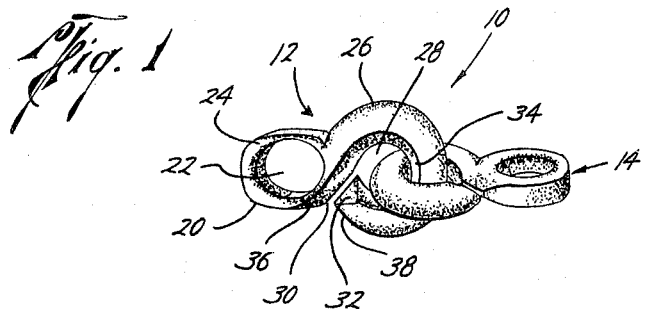
FIG. 1 is a perspective view of the present invention showing it used on a pair of bail hooks constructed and arranged in accordance with this invention, which bail hooks are engaged with one another and positioned in the customary relationship for transmitting a tension load from one to the other.

FIG. 1 illustrates the present invention employed on a pair of the bail hooks which are engaged with one another with the pair being indicated generally at 10. For purposes of description, the bail hook shown on the left-hand side of FIG. 1 is designated at 12 while the identical bail hook illustrated at the right of FIG. 1 is designated at 14.

It will be appreciated that the structure of the hook of this invention is intended for engagement with an identical hook although occasionally may be found to engage one hook with another hook whose slot is disposed at a different angle. Each of the bail hooks 12 and 14 is shown in its customary engaged relationship as might commonly arise when lines, ropes, or other members are connected to the pair of hooks indicated generally at 10 with a tension load placed thereon. For purposes of clarity of illustration, such lines, ropes, or other members are omitted from the drawings; however, it will be understood that the bail hooks indicated generally at 10 are positioned as though under tension.

The hook 12 of this invention may include connective means 20 which includes a member 24 which defines a grommet 22 for receiving the line connected to the bail hook 12. The overall structure of the hook 12 is illustrated as resembling that of a figure 8 with the member 24 being connected at the extended arcuate portion of an encircling member 26 which defines an opening 28 for engaging the bail hook 14. The encircling structure 26 is extended fully about the opening 28 but terminates to form the slot 30. The termination of 26 is defined by the pair of oppositely facing, spaced ends 32. The slot 30 is tangentially related to the opening 28 for ease of connection and to aid in retaining the hooks engaged after connected. The encircling structure 26 is constructed and arranged to limit the movement of the hook 14 to maintain engagement with the opening 28 therein and is structurally adequate to communicate tension loads to the hook 14 which is contacted at or in the vicinity of the point at 34. Of course, the point 34 at the opposite end of the hook 12 from the member 24 as the tension load placed on the lines connected to the hooks 12 and 14 pulls the hooks 12 and 14 to the illustrated position of FIG. 1.

The structure of the hook 14, which is preferably identical to that of the hook 12, is not described in detail but reference is made to the description hereinabove for an indication of its construction. The edges of the hook 12 indicated at 36 and 38, which are defined by the outer periphery of the structure which approximates a figure 8 slope towards the slot 30 as a means for guiding the hook 14 preliminary to engagement. To this end, the edges 36 and 38 extend at an angle with respect to one another to define means for funneling the hook 14 towards the slot at the intersection of the lines, when extended, for guiding the hook 14 into engagement with the hook 12 in the absence of good hand-eye co-ordination.

Attention is directed to FIG. 5 which illustrates the slot 30 and the structure of the hook 12 which defines the two ends adjacent to the slot 30. For purposes of identification, one end is indicated at 32 and the opposite end is indicated at 32′ although it may be appreciated that both may be identical. The drawings illustrate that the hook 12 is essentially planar and FIG. 5 shows the ends 32 and 32′ carried on the planar structure as being spaced apart and facing one another. The point 42 indicates an axis perpendicular to the plane of FIG. 5 which extends through the slot 30 and defines a reference for intersection of a pair of planes 44 and 46. Two of the four angles determined by the intersecting planes 44 and 46 define spaces above and below the axis 42 which spaces extend arcuately of the axis 42 both above and below the axis for receiving the ends of the mating bail hook 14. The ends 32 and 32′ extend less than a total of 180° about the axis 42 in the plane of FIG. 5 and for the use of identical hooks. Therefore, the remainder of the 360° of angular extent encircling the line 42 provides openings for receiving the ends 32 and 32′ of the identical hook 14. The openings defined by the ends 32 and 32′ extend the full length of the slot 30 to permit the hooks to be joined together and to achieve the connective position of FIG. 1 on lateral movement of the slots relative to one another. This will be described in greater detail in relating operation of the hook of this invention. Where it is desired to fully interchange the hooks with other hooks having a tangential slot, the angles represented at 30a and 42a must be not less than 90°.

The slot 30 is shown in FIG. 1 as being tangential to the opening 28 and as extending at an angle of approximately 45° with respect to the longitudinal axis of the hook 12. Alternatively, the slot 30 may extend at any angle with respect to the longitudinally axis of hook 12 using the point 34 as a reference point. The placement of the slot at a 45° angle with respect to the connective means provided at 20 fixes the location of the end 32′ immediately adjacent the connective means 20 whereby the edges 36 and 38 of the hook 12 slope towards a point of intersection at the slot 30 for guiding engagement of the bail hook 14 as described previously.

Figure 2:
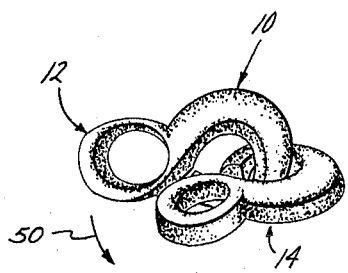
FIG. 2 is a view similar to FIG. 1 with one of the bail hooks rotated through about 135° rotation to align its slot preliminary to disengagement.

Attention is directed to the sequence of FIGS. 1 through 4 for illustrating the manipulations of the hooks 10 of this invention for disengaging same when the slots 30 are at the angles illustrated in the drawings, and it will be understood thereafter that reversal of the sequence illustrated in FIGS. 1 through 4 illustrates the method of engaging the hooks. In FIG. 1, the hooks 12 and 14 are shown connected with contact between the two hooks occurring at the point 34. Each of the hooks is positioned in a plane perpendicular to the mated hook and remains in the connected position for an indeterminate length of time. FIG. 2 is referred to for an illustration of the first step of disengaging the hooks of this invention. The hook 12 is illustrated in the same position as in FIG. 1, but it will be observed that the hook 14 is shown in FIG. 2 as being rotated (while still in the same plane as in FIG. 1) through about 135° of rotation using the point of engagement 34 of hook 12 as an axis of rotation. The rotation carries the connective means formed on the hook 14 to a position adjacent to the connective means carried on the hook 12 as illustrated in FIG. 2. Additionally, it places the slot of the hook 14 in coincidence with the plane of the bail hook 12 as shown in FIG. 2. Thereafter, the hook 12 is rotated in the direction of the arrow 50 shown in FIG. 2 to position the hook 12 for disengagement.

The hook 12 is moved through 135° of rotation about an axis extended through its opening 28 while remaining in the same plane to place the slot 30 in coincidence with the plane of the hook 14. This transition is illustrated as the second step in releasing the bail hooks 12 and 14 of this invention and is illustrated in FIG. 3. FIG. 3 represents the apparatus shown in FIG. 2 upon completion of rotation of the bail hook 12 through about 135° of rotation although FIG. 3 is drawn from an altered perspective point to more clearly illustrate the slots of the bail hooks when each is positioned in the plane of the other bail hook.

The hook 12 is moved in the direction of the arrow indicated at 52 relative to the hook 14 by moving the slot of the hook 12 into contact with the slot formed in the bail hook 14. The interior edges of the openings formed in the hooks engage one another and it will be appreciated that each tends to guide the other towards engagement with the slot as the two hooks are separated.

Attention is directed to FIG. 4 which shows the hooks 12 and 14 separated from one another. This is accomplished upon completing full lateral movement of the ends 32 and 32′ on the hook 12 past the faces of the ends formed in the hook 14. The end faces slide across one another and therepast upon freeing the bail hooks of interconnection.

Details of disengagement are more fully understood by viewing FIG. 5 which illustrates the structure of the bail hook at the slot 30 which shows spaces above and below the axis 42 for receiving the ends of the similar bail hook engaged therewith.

The hooks 12 and 14 of this invention may be re-engaged with one another by reversing the sequence of manipulations illustrated in FIGS. 1 through 4. That is, the hooks are positioned with the slots in axial alignment with one another as illustrated in FIG. 4 whereby lateral movement of one of the hooks towards the other causes the slots to engage. To this end, it is particularly advantageous to utilize the edges 36 and 38 formed about the outer periphery of the hooks which edges guide the hooks towards the slots of one another. Thus, the hooks 12 and 14 need only be urged towards one another and may depend on the guidance of the outer edges 36 and 38 to bring the opposing slots towards one another at the intersection of the edges. Continued lateral motion passes the end faces of each of the hooks across the end faces of the other and positions the encircling structure 26 within the opening of the other. Such positioning of the hooks 12 and 14 completes the engagement of the bail hooks and allows same to be used in any manner desirable. It should be noted that the engagement leaves the hooks each rotated about 135° from the positions illustrated in FIG. 1 but no conscious effort is required to position the bail hooks in the position of FIG. 1 since the customary loading of the bail hooks will move them to the load bearing position and away from the engaging and disengaging position.

The hooks 12 and 14, after engagement, are amenable to any load conditon applied to the hooks by the lines, sheets, or other apparatus connected thereto. If, for instance, the hooks 12 and 14 are in the hands of the user, the hooks may be merely dropped and the ropes or other connective apparatus will pull each of the hooks through the 135° rotation to achieve the position shown in FIG. 1. At this juncture, it should be noted that it is impossible for the hooks to accidentally jiggle or otherwise be manipulated by usage, however, violent, which achieves disconnection. Accidental disengagement would require the rotation of each of the bail hooks of about 135° which would position the bail hooks with slots aligned and adjacent to the ropes or other lines connected to the bail hooks. Moreover, the aligning of the slots does not achieve disengagement. Disengagement requires the additional lateral movement of the bail hooks to bring the slots into engagement, into sliding contact with one another, and additional lateral movement to achieve disengagement as illustrated in FIG. 4. Such accidental maneuvers of the apparatus connected to the bail hooks actually requires the urging of the apparatus connected to each of the bail hooks towards one another after achieving the required rotation of each of the bail hooks in a manner which is impossible to achieve with ropes, sails, sheets, connective lines, turnbuckles, or the like.

Certain alterations may be incorporated with the apparatus of this invention without departing from the scope of the claim. For instance, the hooks 12 and 14 are preferably identical. It is not required that they be of the same precise configuration, size, or thickness. Further, each of the hooks includes a connective means at one end for receiving and connecting to a loop of rope or the like. It will be understood that other connective means, such as a swivel, may be used to secure the hook to any selected apparatus. For instance, a hook may be provided for connection to the corner of a sail or may be provided with connective means for securing same at fixed locations.

As previously noted, the tangential slot 30 may be arranged at any angle relative to the axis of the hook of the present invention. While the structural concept of this invention has been shown in one form in relation to bail hooks, it may be employed with any hooks without departing from the scope of the invention.

Broadly, this invention describes a pair of fail-safe hooks which are adapted to be engaged with one another and which are provided with slots extending tangentially with respect to the openings thereof as a means of preventing accidental disengagement.

What is claimed is:

A releasable hook-type connector, comprising:

(a) a first hook having an encircling structure extending about an opening;

(b) said encircling structure being interrupted by a slot which defines a pair of oppositely facing wedge-shaped ends in said structure;

(c) said structure having an eye at one end for connection to a line for placing a tension load on said first hook;

(d) said eye and said hook opening lying in the same plane and on a common longitudinal axis.

(e) said slot being disposed adjacent to said eye and extending in a substantially tangential direction to the opening in said hook and extending at about a 45° angle with respect to said longitudinal axis;

(f) said slot being defined by a first wall and a second wall, said first wall being a continuation of the inner surface of said opening and being wedge-shaped, said wedge-shape extending in said tangential direction into said hook opening;

(g) said second wall being substantially disposed opposite said first wall and also wedge-shaped;

(h) a second hook having a substantially identical structure as said first hook;

(i) said first and second hooks being connected together by the extending of the encircling structure of each hook through the opening of the other so that the hooks remain connected when a tension force is exerted thereon;

(j) the ends of the slot of said first hook becoming aligned and fitting within the ends of the slot of the second hook only upon a disposition of said hooks substantially side-by-side and followed by a rotation of said hook relative to said first hook; and (k) said slot ends when so aligned being adapted to slide relative to each other and with the lines connected to the hooks being pulled towards each other for effecting a release of said hooks from each other.

UNITED STATES PATENTS

References Cited by the Examiner

| Re. 7,235 | 7/1876 | Haworth | 24—201 X |
| 367,969 | 8/1887 | Gawn | 24—201 |
| 1,375,724 | 4/1921 | Oponiak. | |
| 2,785,578 | 3/1957 | Nold | 59—85 X |
| 3,132,395 | 5/1964 | Luketa | 24—201 |

FOREIGN PATENTS

| 16,908 | 9/1893 | Great Britain. |
| 16,983 | 7/1896 | Great Britain. |

BERNARD A. GELAK, *Primary Examiner.*